US012639115B2

(12) United States Patent
Healy et al.

(10) Patent No.: US 12,639,115 B2
(45) Date of Patent: May 26, 2026

(54) MANUAL QUBIT MAPPING DURING TRANSPILATION

(71) Applicant: Dell Products L.P., Round Rock, TX (US)

(72) Inventors: Brendan Burns Healy, Haddonfield, NJ (US); Rômulo Teixeira de Abreu Pinho, Niterói (BR); Victor Fong, Medford, MA (US)

(73) Assignee: Dell Products L.P., Round Rock, TX (US)

( * ) Notice: Subject to any disclaimer, the term of this patent is extended or adjusted under 35 U.S.C. 154(b) by 405 days.

(21) Appl. No.: 18/345,485

(22) Filed: Jun. 30, 2023

(65) Prior Publication Data

US 2024/0160475 A1      May 16, 2024

Related U.S. Application Data

(60) Provisional application No. 63/383,341, filed on Nov. 11, 2022.

(51) Int. Cl.
*G06F 9/50* (2006.01)
*G06N 10/40* (2022.01)
*G06N 10/70* (2022.01)

(52) U.S. Cl.
CPC .......... *G06F 9/5011* (2013.01); *G06N 10/40* (2022.01); *G06N 10/70* (2022.01)

(58) Field of Classification Search
CPC ..... G06F 9/5011; G06F 9/5077; G06N 10/40; G06N 10/70; G06N 10/00
USPC ....................................................... 714/746
See application file for complete search history.

(56) References Cited

U.S. PATENT DOCUMENTS

| | | | | | |
|---|---|---|---|---|---|
| 10,922,166 | B2 * | 2/2021 | Hogaboam | ............ | G06N 10/60 |
| 11,374,594 | B2 * | 6/2022 | Hogaboam | ............ | G06N 3/049 |
| 11,580,433 | B2 * | 2/2023 | Javadiabhari | ........... | G06F 30/32 |
| 11,615,329 | B2 * | 3/2023 | Wang | ..................... | G06N 10/00 |
| | | | | | 706/46 |
| 11,645,568 | B2 * | 5/2023 | Chen | ...................... | G06N 10/20 |
| | | | | | 703/19 |
| 2022/0084085 | A1 * | 3/2022 | Rigetti | .............. | H04M 15/8214 |
| 2024/0160475 | A1 * | 5/2024 | Healy | .................... | G06N 10/70 |
| 2025/0036986 | A1 * | 1/2025 | Ushijima | ................. | G06N 5/01 |
| 2025/0378359 | A1 * | 12/2025 | Nation | ................... | G06N 10/20 |

OTHER PUBLICATIONS

Wilson, et al., Just-in-Time Quantum Circuit Transpilation Reduces Noise, ArXiv:2005.12820 [Quant-Ph], May 26, 2020. http://arxiv.org/abs/2005.12820.
Qiskit, Obtaining information about your backend, accessed on Sep. 2022, https://qiskit.org/documentation/tutorials/circuits_advanced/08_gathering_system_information.html.

* cited by examiner

*Primary Examiner* — James C Kerveros
(74) *Attorney, Agent, or Firm* — Workman Nydegger

(57) ABSTRACT

One example method includes obtaining error information for physical qubits that are candidates for mapping by respective virtual qubits of a quantum circuit, sampling the physical qubits based on their respective error information, mapping the virtual qubits to the physical qubits obtained by the sampling, and performing a shot of the quantum circuit on the sampled physical qubits. These operations may be performed 'n' times until an acceptable result is obtained for execution of the quantum circuit.

18 Claims, 4 Drawing Sheets

400

MANUAL QUBIT MAPPING DURING TRANSPILATION

FIELD OF THE INVENTION

Embodiments of the present invention generally relate to quantum computing. More particularly, at least some embodiments of the invention relate to systems, hardware, software, computer-readable media, and methods, for manual qubit mapping during transpilation.

BACKGROUND

A quantum circuit transpilation process may involve creating or modifying a given input circuit to match the topology of a particular quantum system or device. Transpilation may also involve optimization of a particular input circuit for execution on a particular quantum system or device.

One operation that may take place as part of a quantum circuit transpilation process is the mapping of virtual qubits, which may be manipulated by a quantum algorithm or 'quantum circuit,' to physical qubits which are connected in some particular topology on an actual QPU (quantum processing unit) device. This mapping may be performed automatically, with a quantum computing services vendor simply selecting, through the transpilation algorithm, some correspondence of virtual qubits to physical qubits which meets the needs of the algorithm in terms of which qubits are connected. A number of problems have arisen in connection with some transpilation processes.

Transpilation is typically performed only once prior to the execution of a circuit, according to some optimization objective. All circuit shots, that is, multiple executions of the same circuit, are performed with the same transpilation output. Thus, a sub-optimal transpilation outcome may lead to poor execution quality. Further, some qubits, or inter-qubit connections, may have lower quality than others, and the user, such as a quantum algorithm developer, has no fine-grained control over qubit mappings. Finally, it may be impossible to know a priori, for any given hardware, what qubit mappings, that is, mappings from virtual qubits to physical qubits, will provide the most accurate results when a quantum circuit is executed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying Figures.

DETAILED DESCRIPTION OF SOME EXAMPLE EMBODIMENTS

Figure 1:
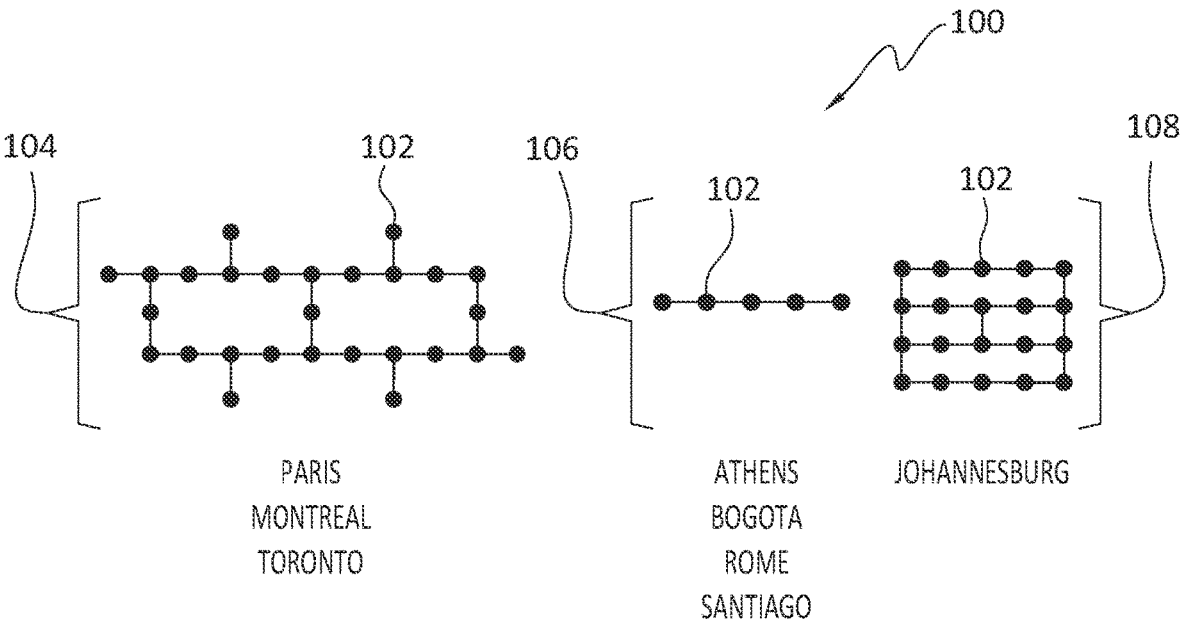
FIG. 1 discloses some example systems and QPU connection configurations.

Embodiments of the present invention generally relate to quantum computing. More particularly, at least some embodiments of the invention relate to systems, hardware, software, computer-readable media, and methods, for manual qubit mapping during transpilation.

In one example embodiment, a mapping operation of a transpilation process is performed after each circuit shot, that is, after each time a circuit is executed on quantum computing hardware. Each mapping operation may comprise, for a particular virtual qubit of the circuit, selection of a physical qubit to which that virtual qubit is mapped. In an embodiment, the mapping operations may be random, that is, a virtual qubit may be randomly mapped to a physical qubit each time an iteration of the mapping operation is performed. The probability that a virtual qubit will be mapped to a particular physical qubit may be a function of the relative quality of that physical qubit where such quality may be indicated, for example, by the values of qubit parameters such as frequency, noise, pulse amplitudes, and DRAG (derivative removal adiabatic gates). The mapping operations may collectively define an output state vector or simply 'output,' of the quantum circuit, which indicates a mitigation of circuit errors that might otherwise have accumulated if sub-optimal, and/or fixed, qubit mappings were made. That is, due to the probabilistic nature of quantum processes, this randomization and repetition of the mapping may, in an embodiment, reduce the circuit error experienced when the circuit is executed on the physical quantum hardware. An embodiment may strike a balance between transpilation quality and performance, since performance of repeated circuit shots to improve transpilation quality may be computationally expensive, depending on the number of shots in a given case.

Further information concerning one or more example embodiments of the invention is disclosed in Appendix A hereto. Appendix A forms a part of this disclosure and is incorporated herein in its entirety by this reference.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that transpilation quality may be improved without imposition of an undue computational overhead. An embodiment may employ a quality measure to ensure that a transpilation meets a specified objective measure. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Introduction

One or more embodiments of the invention are concerned with transpilation processes in quantum environments, particularly, transpilation processes that comprise a mapping component or operation. As used herein, a quantum circuit transpilation process, or simply 'transpilation,' embraces, but is not limited to, processes for modifying a given input circuit so that the circuit matches the topology of a specific quantum device, and/or processes for optimizing an input circuit for execution on particular quantum computing hardware. Transpilation processes according to one or more embodiments may deal with the problem of accumulated circuit error.

As noted earlier herein, a mapping operation may be performed automatically, in which some correspondence of virtual qubits to physical qubits is selected which meets the needs of the algorithm in terms of which qubits are connected. FIG. 1 discloses an example 100 of how QPUs 102 in various systems may be connected. In this example, the QPUs 102 belong to IBM, and each computing system has the name of a particular city. In general, the qubit configuration, or geometry, may vary from one system to another. In the example 100 of FIG. 1, it can be seen that the systems 'Paris,' 'Montreal,' and 'Toronto' have the qubit configuration 104. In contrast, the systems 'Athens,' 'Bogota,' 'Rome' and 'Santiago' have a smaller, and simpler, qubit configuration 106. Finally, the 'Johannesburg' system has the qubit configuration 108.

B. Context for an Embodiment of the Invention

Note that a typical transpilation use case may be agnostic as to how the virtual-to-physical qubit mapping happens, so long as the circuit can be evaluated in some way. However, there are cases where this choice may in fact matter. Certain transpilation optimizations may lead to qubit mappings that may be less favorable in terms of noise, for example, if the transpilation objective optimizes for the minimum number of qubit swap operations to reduce overall execution time. That is, such a process may optimize for one parameter at the expense of another.

In an embodiment then, using multiple qubit mappings, that is, performing multiple mapping iterations, for the same circuit in order to determine optimal configurations for the circuit may be especially useful for circuits or patterns of circuits that are intended to be evaluated many times. Thus, an embodiment of the invention may account for the probabilistic nature of quantum processes, through randomization and repetition of a mapping process, so as to reduce the circuit error experienced when a circuit is executed on the physical quantum hardware. By way of further illustration, the greater the amount of noise generated by particular quantum computing hardware, the more shots may be needed to provide a desired level of confidence that the output of the circuit being executed on that hardware is satisfactory. There may be a tradeoff however, between the number of shots, and the quality of the output of the circuit, since more shots take more time and use more computing resources than if fewer shots were taken and a lower quality output obtained.

C. General Aspects of One or More Example Embodiments

An embodiment may operate to provide multiple transpilation operations and so avoid, or minimize, poor quantum circuit (QC) execution quality that may otherwise be experienced in circumstances in which transpilation is performed only once prior to the execution of the circuit, according to some optimization objective. That is, in sub-optimal circumstances addressed by an embodiment, circuit shots, that is, multiple executions of the same circuit, may be performed based on the same transpilation output. By performing multiple transpilation operations, an embodiment may avoid a sub-optimal transpilation outcome, that may lead to poor circuit execution quality, that results from the performance of only a single transpilation operation.

An embodiment may provide for relatively fine-grained control, such as by a quantum algorithm developer, over qubit mappings. This approach may avoid the circumstance in which some qubits, or inter-qubit connections, may have lower quality than others, but in which the developer cannot control the mappings to the extent needed to be able to use higher quality qubits that may be available.

An embodiment may, a priori, for any given hardware, know or determine what qubit mappings, from virtual to physical, will provide the most accurate results in terms of, for example, the execution of the QC.

D. Example Architecture

Figure 2:
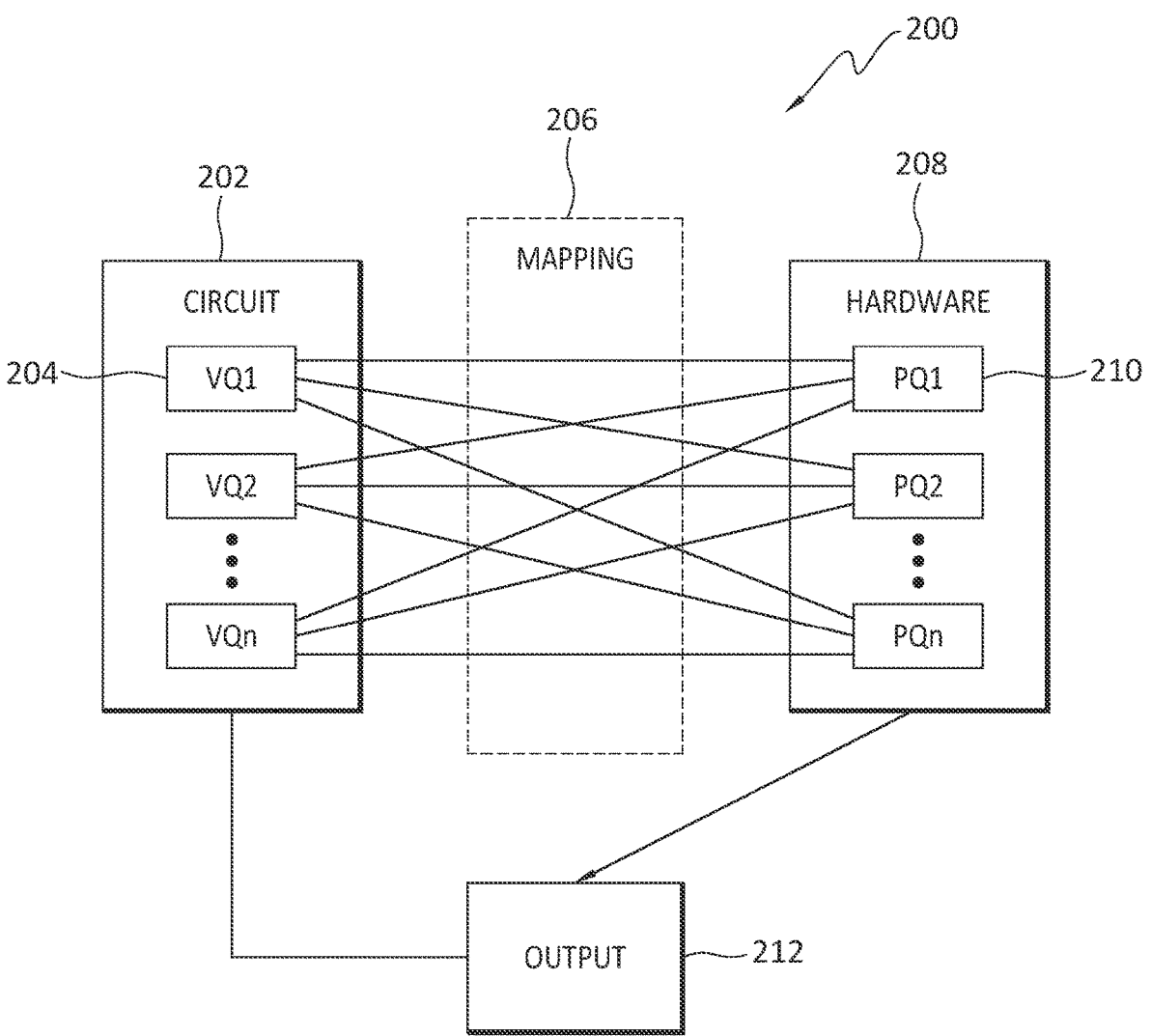
FIG. 2 discloses an architecture according to one example embodiment.

With attention now to FIG. 2, an architecture according to one example embodiment is denoted generally at 200. As shown there, an example quantum circuit 202 may comprise various virtual qubits 204. Any number 'n' of virtual qubits 204 may be included in a circuit, where 'n' is any integer equal to or greater than one. A mapping infrastructure 206 may communicate with, or at least access, the quantum circuit 202. The mapping infrastructure 206 may comprise a system, method, module, and/or any other elements configured and operable to perform mapping functions as disclosed herein. In an embodiment, use of the mapping infrastructure may be invoked as part of a transpilation process.

In general, the mapping infrastructure 206 may operate to map the virtual qubits 204 to quantum computing hardware 208 and, specifically, to one or more physical qubits 210. Any number 'n' of physical qubits 210 may be included in the quantum computing hardware 208, where 'n' is any integer equal to or greater than one. In more detail, the mapping infrastructure 206 may randomly, and repeatedly, map the virtual qubits 204 to respective physical qubits 210. Note that in FIG. 2, a line connects each of the virtual qubits

204 to each of the physical qubits. This is simply to indicate that each of the physical qubits 210 is a candidate for mapping of one of the virtual qubits 204. In practice, only one virtual qubit 204 may be mapped to a physical qubit 210. Each of these mapping operations may be an element of a respective instance of a transpilation process. In an embodiment, a respective mapping operation may be performed after each circuit 202 shot.

As mentioned above, there is a quality versus performance trade-off in the circumstance where multiple shots are performed, since running transpilation prior to each shot may be computationally expensive. Alternatively, the random mapping and re-transpilation of the circuit 202 may be implemented at pre-defined times to mitigate the performance impact. For example, and given an expected number of shots, the random mapping and transpilation may be performed only every fourth shot.

The output resulting from each execution of the circuit 202 on the hardware 208 may be captured and may define an output 212, which may or may not comprise a state vector. In an embodiment, the output 212 may not be a full state vector but may, instead, comprise a list of bit vectors which represent a sampling from the underlying probability distribution informed by the state vector.

The output 212 may include information, such as metadata and performance statistics and parameters, indicating the performance of the hardware 208 when executing the circuit 202. The output 212 may thus mitigate, or indicate the mitigation of, accumulated errors that might have been incurred by sub-optimal, and/or fixed, mappings of virtual qubits 204 to physical qubits 210. As noted herein, additional, or alternative, metrics may be used for determining a probability mass function E(P), such as qubit decoherence times, and qubit latency, for example. One example of such a probability mass function E(P) is discussed below.

E. Detailed Description

An embodiment may identify and implement a quality vs performance trade-off in which transpilation is done repeatedly, in between circuit shots, so as to mitigate accumulated circuit errors. An embodiment may comprise a modification to a transpilation approach in which the qubit mapping, which may be the first operation of the transpilation process, is randomized each time it is executed.

In an embodiment, and with reference to the example of FIG. 2, a randomization process may consider the calibration data of physical qubits 210, that is, their most up-to-data quality measurements, in order to implement the mapping portion of a transpilation process. An embodiment may operate such that at some point in time, such as, but not limited to, once a day, prior to execution of a circuit 202, or in between shots, the calibration data may be collected for all physical qubits, such as the physical qubits 210, that may be mapping candidates for a virtual qubit 204 of a circuit 202. To the extent that the calibration data for a particular physical qubit 210 reflects the quality of that physical qubit 210, the calibration data may indicate an actual or expected error associated with the operation of that physical qubit 210 when executing the circuit 202. The quality, in turn, may refer to the value of parameters such as, but not limited to, gate fidelity, and noise, associated with operation of a physical qubit 210.

Note that a quantum hardware 208 vendor may offer functionality to obtain calibration data. Regardless of how the calibration data is sourced or obtained, an embodiment may use calibration data to obtain a normalized relative error of qubits, which may be expressed as:

$$e_i = \frac{Err(p_i)}{\sum Err(p_i)}$$

In the above equation, $e_i$ is the normalized error associated with physical qubit $p_i$ 210. An embodiment may use $e_i$ as the probability of a virtual qubit 204 being assigned to a physical qubit $p_i$ 210. Thus, an embodiment may define E(P) as the probability mass function of physical qubits 210 being selected for mapping according to their respective updated error data.

During the mapping operation of a transpilation process, an embodiment of an algorithm may, for each virtual qubit $q_j$ 204 sample from E(P) (without replacement) the physical qubit $p_i$ 210 to which virtual qubit $q_j$ 204 may be mapped. Then, the transpilation may proceed normally with its process so that some objective function may be optimized for the given mapping. According to an embodiment, this operation may be repeated before each shot of the quantum circuit 202 so that a new mapping of virtual qubits 204 to physical qubits 210 is randomly obtained, as sampled from E(P) for example, each time the operation is performed.

In the end, an embodiment may operate such that the output state vector 212 of the quantum circuit 202, or any sampling thereof, may mitigate accumulated errors that may have been incurred by sub-optimal, and fixed, qubit mappings. An example of fixed qubit mappings is the qubit mappings obtained in a circumstance where transpilation is performed only once, rather than multiple times, as in one or more embodiments of the invention. Note that other metrics may be used for determining E(P), such as, but not limited to, qubit decoherence times, and qubit latency, for example.

Thus, an embodiment may provide for a quality versus performance trade-off, since running transpilation prior to each shot can be computationally expensive, but may also produce better quality results. In one alternative embodiment, the random mapping and re-transpilation of the circuit may be performed at pre-defined times, such as at each quarter of the total number of shots, so as to aid in mitigating the performance impact.

F. Further Discussion

As will be apparent from this disclosure, one or more embodiments may possess various useful features and aspects. A non-exhaustive list of examples of such features and aspects is set forth below. No embodiment is required to comprise any of these features and aspects. Further, these are presented only by way of example and are not intended to limit the scope of the invention in any way. An embodiment may implement repeated, random, mapping of virtual qubits to physical qubits as part of a process that comprises execution of quantum circuits. As another example, an embodiment may define and use a probability mass function to assign virtual qubits to physical qubits based on some relative quality metric. In another example, an embodiment may provide for sampling from a probability mass function to select to a physical qubit to which a virtual qubit will be mapped.

G. Example Methods

Figure 3:
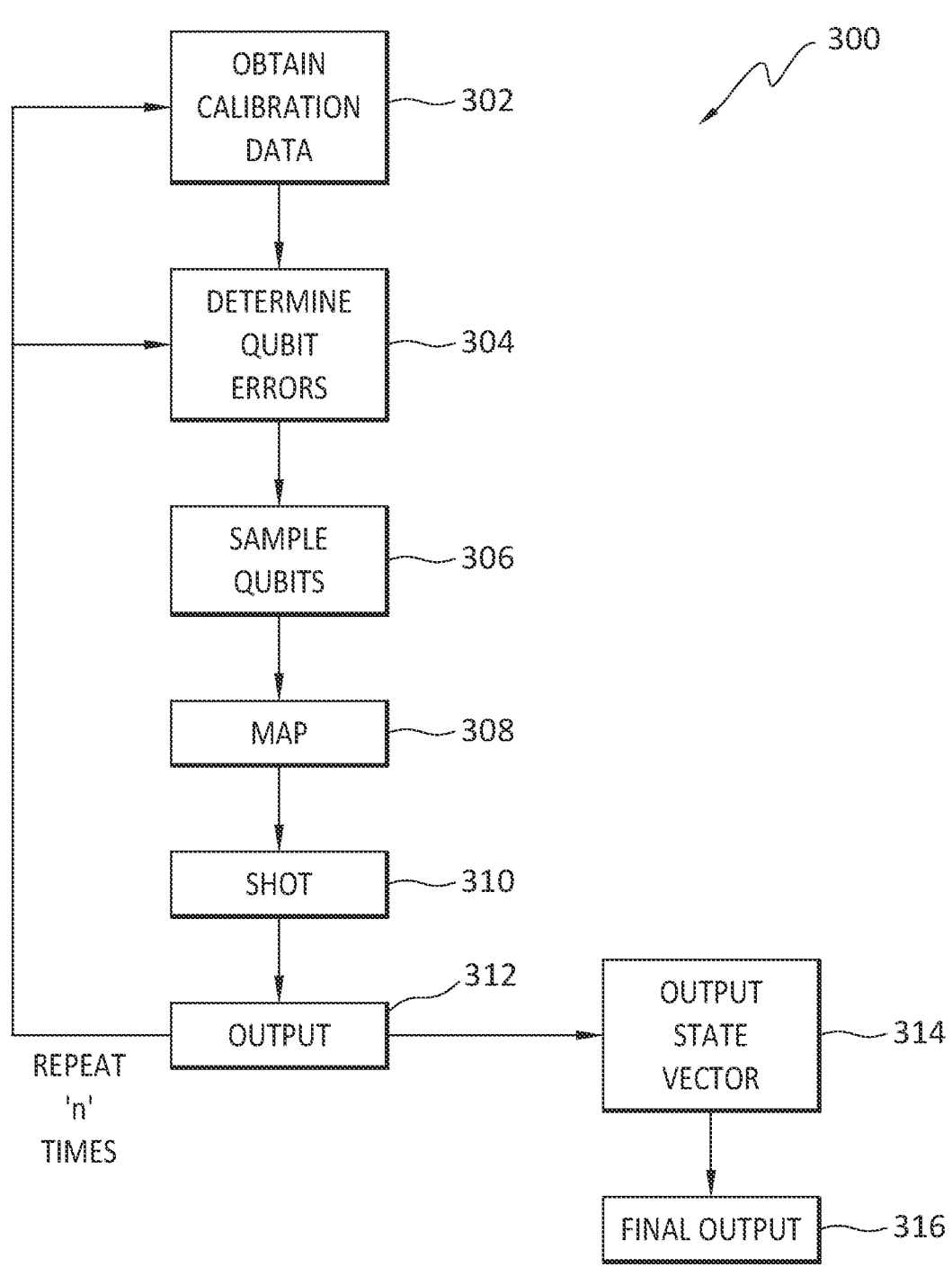
FIG. 3 discloses a method according to one example embodiment.

It is noted with respect to the disclosed methods, including the example method of FIG. 3, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 3, a method according to one example embodiment is generally indicated at 300. In an embodiment, the method 300 may begin with obtaining calibration data 302 for physical qubits that may be candidates for mapping to by virtual qubits of a quantum circuit. The calibration data may then be used to determine 304 errors for each of the physical qubits.

The available physical qubits may then be sampled 306 for a mapping process. As noted herein, the probability that a virtual qubit will be assigned to a given physical qubit being sampled for mapping may be a function of the error of that particular physical qubit relative to a cumulative error of all the physical qubits that could possibly be sampled. Thus, as between two physical qubits with different respective errors, the physical qubit with the smaller error may be more likely to have a virtual qubit sampled 306 and then assigned to it in a mapping process.

After the physical qubits have been sampled 306, the virtual qubits of the circuit may then be mapped 308 to those physical qubits. When the mapping 308 is completed, a circuit shot may be performed 310 on the selected physical qubits to which the virtual qubits of the circuit have been mapped. The output or results 312 of the shot may then be collected. As shown in FIG. 3, at least the operations 304-310, and possibly 302-310, may be performed repeatedly, so as to enable definition 314 of an output state vector including information and/or results obtained by execution of the circuit on the various physical qubits to which the virtual qubits of the circuit were mapped. In an embodiment, an output state vector may be updated after each successive mapping operation.

When a desired number of mapping operations, and associated transpilation operations, have been performed, a final output 316 of the circuit may be obtained. Because this output may be generated based on multiple, possibly randomized, mapping operations, the output may comprise, or represent, a mitigation of the error that may be expected if only a single transpilation process, and/or one or more sub-optimal transpilation processes, had been performed.

H. Further Example Embodiments

Following are some further example embodiments of the invention. These are presented only by way of example and are not intended to limit the scope of the invention in any way.

Embodiment 1. A method, comprising: performing 'n' times, where 'n' is any integer equal to or greater than two, operations comprising: obtaining error information for physical qubits that are candidates for mapping by respective virtual qubits of a quantum circuit; sampling the physical qubits based on their respective error information; mapping the virtual qubits to the physical qubits obtained by the sampling; and performing a shot of the quantum circuit on the sampled physical qubits.

Embodiment 2. The method as recited in any preceding embodiment, wherein the error information is determined based on calibration data for the physical qubits.

Embodiment 3. The method a recited in any preceding embodiment, wherein the mapping is performed randomly as part of execution of the quantum circuit.

Embodiment 4. The method as recited in any preceding embodiment, wherein a probability mass function is used as a basis for assigning the virtual qubits to the physical qubits.

Embodiment 5. The method as recited in any preceding embodiment, wherein the physical qubits are sampled from a probability mass function to select the physical qubits for mapping of the virtual qubits.

Embodiment 6. The method as recited in any preceding embodiment, wherein the error information for a given physical qubit indicates a relative quality of performance of that physical qubit when executing a quantum circuit.

Embodiment 7. The method as recited in any preceding embodiment, wherein the mapping is performed after each of n+1 shots.

Embodiment 8. The method as recited in any preceding embodiment, wherein an aggregate result of performance of the physical qubits after 'n' shots is relatively better than a performance of the physical qubits after only one shot.

Embodiment 9. The method as recited in any preceding embodiment, wherein each iteration of the mapping comprises an element of a respective transpilation process.

Embodiment 10. The method as recited in any preceding embodiment, wherein the error information for a given one of the physical qubits is normalized relative to an aggregate error for all of the physical qubits.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed. In general, embodiments may comprise classical, and/or quantum, hardware and/or software. Quantum hardware may include, for example, physical qubits. Quantum circuits may comprise, for example, virtual qubits.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
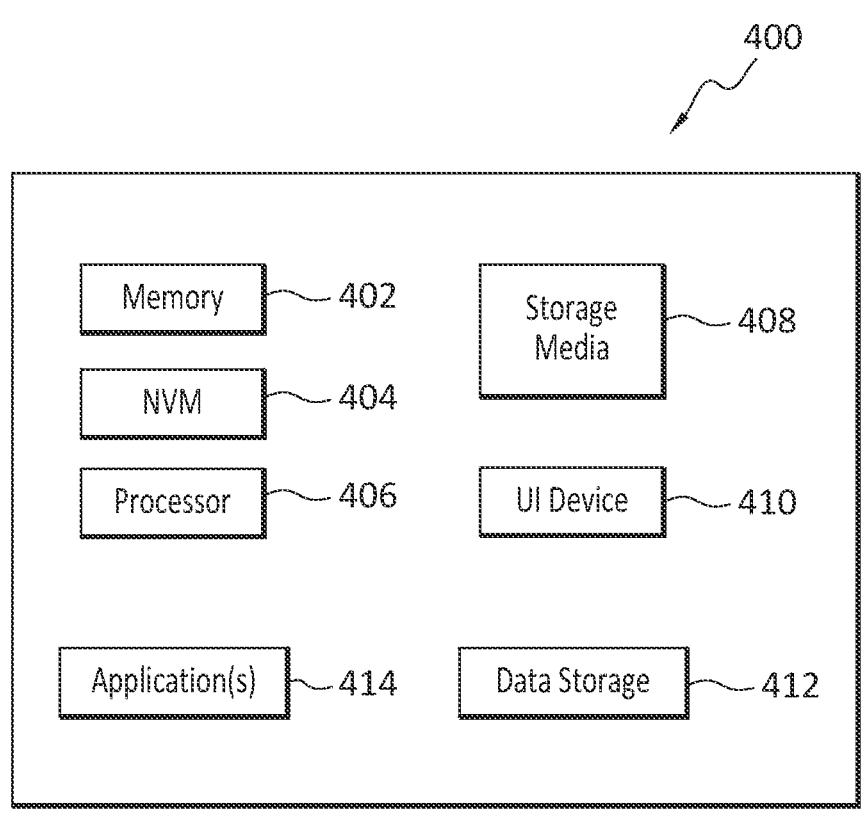
FIG. 4 discloses a computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

performing 'n' times, where 'n' is any integer equal to or greater than two, operations comprising:

obtaining, from a quantum computing hardware, error information for physical qubits of the quantum computing hardware, wherein the physical qubits are candidates for mapping by respective virtual qubits of a quantum circuit;

sampling the physical qubits based on their respective error information;

mapping the virtual qubits of the quantum circuit to the physical qubits, which are selected by the sampling, of the quantum computing hardware;

transpiling the quantum circuit, based on the mapping, for execution on the physical qubits of the quantum computing hardware; and performing a shot by executing the transpiled quantum circuit on the selected physical qubits.

2. The method as recited in claim 1, wherein the error information is determined based on calibration data for the physical qubits.

3. The method a recited in claim 1, wherein the mapping is performed randomly as part of execution of the quantum circuit.

4. The method as recited in claim 1, wherein a probability mass function is used as a basis for assigning the virtual qubits to the physical qubits.

5. The method as recited in claim 1, wherein the physical qubits are sampled from a probability mass function to select the physical qubits for mapping of the virtual qubits.

6. The method as recited in claim 1, wherein the error information for a given physical qubit indicates a quality of performance of that physical qubit when executing a quantum circuit.

7. The method as recited in claim 1, wherein the mapping is performed after each of n+1 shots.

8. The method as recited in claim 1, wherein an aggregate result of performance of the physical qubits after 'n' shots is better than a performance of the physical qubits after only one shot.

9. The method as recited in claim 1, wherein the error information for a given one of the physical qubits is normalized relative to an aggregate error for all of the physical qubits.

10. A non-transitory storage medium having stored therein instructions that are executable by one or more hardware processors to perform operations comprising:

performing 'n' times, where 'n' is any integer equal to or greater than two, operations comprising:

obtaining, from a quantum computing hardware, error information for physical qubits of the quantum computing hardware, wherein the physical qubits are candidates for mapping by respective virtual qubits of a quantum circuit;

sampling the physical qubits based on their respective error information;

mapping the virtual qubits of the quantum circuit to the physical qubits, which are selected by the sampling, of the quantum computing hardware;

transpiling the quantum circuit, based on the mapping, for execution on the physical qubits of the quantum computing hardware; and performing a shot by executing the transpiled quantum circuit on the selected physical qubits.

11. The non-transitory storage medium as recited in claim 10, wherein the error information is determined based on calibration data for the physical qubits.

12. The non-transitory storage medium a recited in claim 10, wherein the mapping is performed randomly as part of execution of the quantum circuit.

13. The non-transitory storage medium as recited in claim 10, wherein a probability mass function is used as a basis for assigning the virtual qubits to the physical qubits.

14. The non-transitory storage medium as recited in claim 10, wherein the physical qubits are sampled from a probability mass function to select the physical qubits for mapping of the virtual qubits.

15. The non-transitory storage medium as recited in claim 10, wherein the error information for a given physical qubit indicates a quality of performance of that physical qubit when executing a quantum circuit.

16. The non-transitory storage medium as recited in claim 10, wherein the mapping is performed after each of n+1 shots.

17. The non-transitory storage medium as recited in claim 10, wherein an aggregate result of performance of the physical qubits after 'n' shots is better than a performance of the physical qubits after only one shot.

18. The non-transitory storage medium as recited in claim 10, wherein the error information for a given one of the physical qubits is normalized relative to an aggregate error for all of the physical qubits.

* * * * *